March 22, 1927.
A. P. FILIPPI
HELICOPTER
Filed Feb. 6, 1926
1,622,191
3 Sheets-Sheet 1
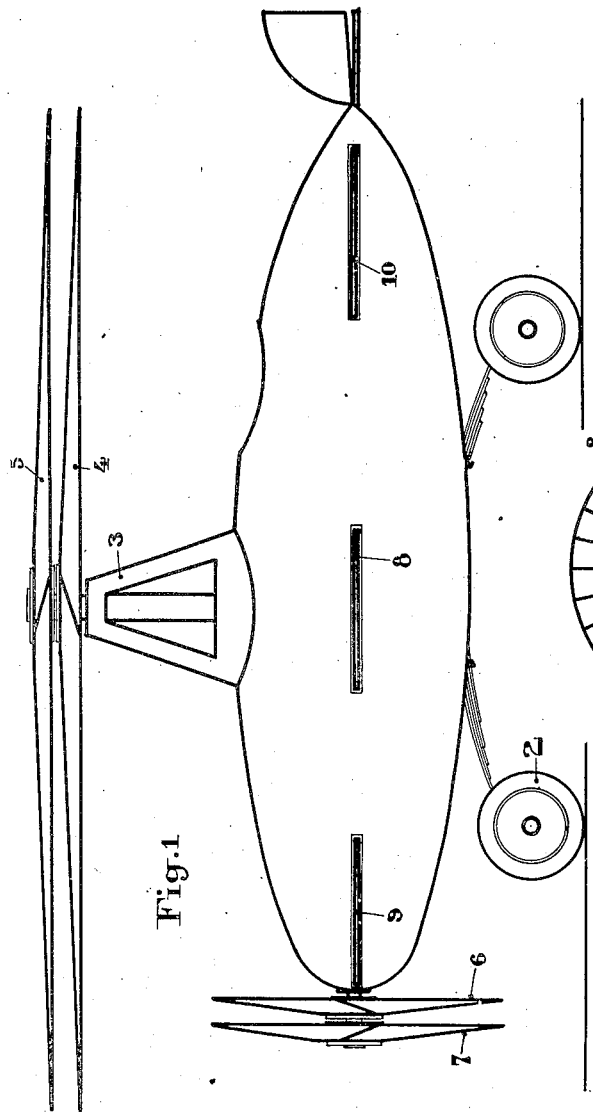
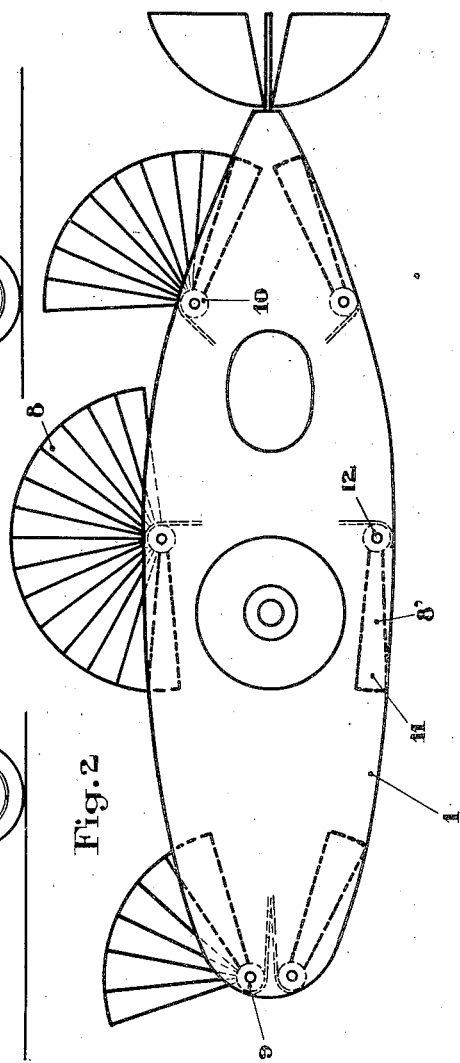
Inventor
A. P. Filippi
by Langner, Parry, Card & Langner
Atty's.

March 22, 1927.

A. P. FILIPPI

HELICOPTER

Filed Feb. 6, 1926   3 Sheets-Sheet 2

1,622,191

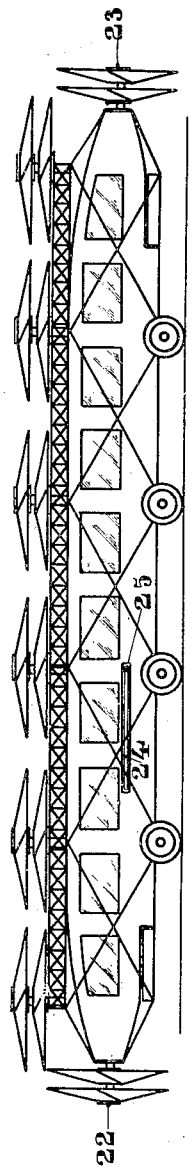
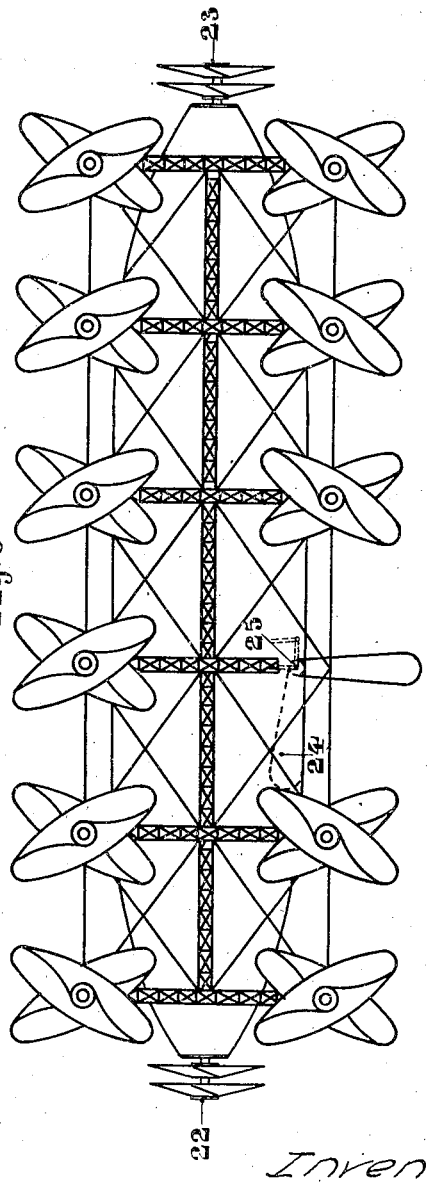

Patented Mar. 22, 1927.

UNITED STATES PATENT OFFICE.

ANTOINE PADOUE FILIPPI, OF PARIS, FRANCE.

HELICOPTER.

Application filed February 6, 1926, Serial No. 86,514, and in France February 27, 1925.

It is well known how difficult it is to obtain, by means actually known, the stability of a helicopter which is rising or descending vertically, which is moving slowly in an inclined or horizontal direction, and in a general manner when the speed relatively to the surrounding medium is too weak for the action of the ordinary propellers to be efficient.

The present invention has for its subject means for enabling the stability of equilibrium of helicopters to be obtained in their normal position of ascent, descent or flight.

This means consists in using the action, on auxiliary variable surfaces, of a current of air produced by the supporting plane or planes of the helicopter.

The current of air produced by the supporting member of the helicopter has in fact a certain kinetic force.

In opposing to this current of air surfaces which are varied either in size or direction, there is added to the various forces acting on the apparatus a supplementary component which is capable of variation in view of the results which it is desired to obtain.

These may be very different.

When, under any influence, the apparatus is caused to deviate from its normal position of ascent, descent or flight, it can be returned to this position.

It is also possible to modify the movements of ascent and descent.

Finally it is possible to act upon the steering of the apparatus about its vertical axis without it being necessary to bring into operation the members for horizontal propulsion in order to assist this operation.

The variation of the auxiliary surfaces which are used may be effected automatically or actuated or both operations may be effected simultaneously.

Hereinafter there is described an operating device of which the action may be adjusted automatically either by the action of a pendulum or by the action of a gyroscope system.

This device constitutes an automatic operating valve.

It is provided with a hemispherical dome communicating with a compressed air tank and in the diametral plane of which there is located a thick diaphragm capable of oscillating in all directions about the centre of the sphere under the action of the pendulum or gyroscope.

Finally in the wall of the spherical dome and also along a diametral plane, there are provided a certain number of openings communicating with cylinders in which are adapted to move pistons subjected to the action of opposing springs and of which the movements produce the movement of the members to be actuated.

In its normal position the edge of the diaphragm partially covers the said openings.

It separates them from the hemispherical recess containing compressed air and leaves them in communication with the atmosphere.

When oscillating about its centre the diametral diaphragm deviates from its normal position and brings one or more of the cylinders in communication with the interior of the spherical dome. The compressed air contained in the dome acts upon the corresponding pistons and produces a compression of the springs opposing the movement of the pistons and the members to be operated to be moved.

When the diametral diaphragm returns to its normal position it closes communication between the interior of the spherical dome and the cylinders and the latter are simultaneously brought into communication with the atmosphere so that the corresponding pistons, under the action of the said springs, return to their original position as also the members which were previously moved.

In the accompanying drawings are illustrated, by way of example, various forms of the application of the invention.

Figure 1 is a view in elevation of a helicopter provided laterally with expansible auxiliary surfaces.

Figure 2 is a plan view of the same apparatus, the supporting device being omitted.

Figure 5 is a view in elevation of a helicopter in which the single group of supporting planes is replaced by a series of groups of supporting planes and wherein there is combined with the pulling group a propelling group, and Figure 6 is a plan view of the apparatus illustrated in elevation in Figure 5, one of the groups of supporting planes being omitted.

Figure 3:
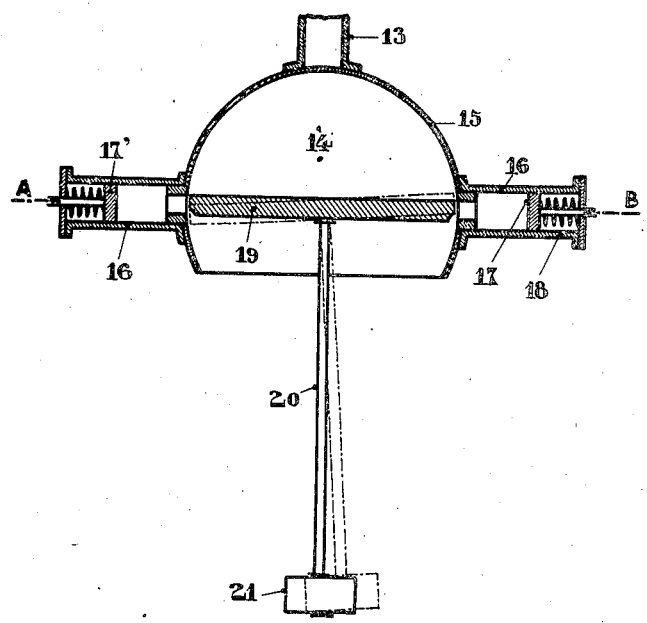
Figure 3 illustrates a section of the operating device along a vertical plane passing through the axis of this device.

The apparatus shown in Figures 1 and 2 is provided with a hull 1 having at its lower part a carriage 2 and at its upper part a group of supporting planes 3 composed of two cyrnos planes, of the Filippi system, 4 and 5 turning in opposite directions.

The apparatus provided at the front with a pulling group also composed of two cyrnos blades of the Filippi system 6 and 7.

Finally at various points of its equatorial plane, at 8, 9, 10, the apparatus is provided with auxiliary expansible surfaces adapted to ensure the stability of its equilibrium. These surfaces are composed of a series of blades 11 capable of turning about an axis 12 and of which the whole constitutes a kind of fan. At 8 the surface is shown completely extended. At 8' all the blades are collapsed and accommodated in the interior of the hull so as to ensure the complete withdrawal of the said surface.

It will be readily understood that if the apparatus deviates to the right, to the left, to the front, or to the rear of its normal position it will be sufficient to expand a suitable amount of the surfaces 8, 9 or 10 to cause the apparatus to return into its position.

Figure 4:
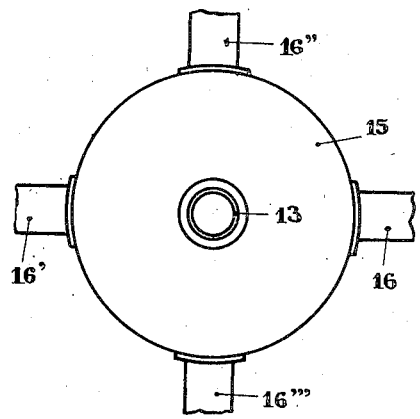
Figure 4 is a plan view of the same device.

In Figures 3 and 4 is shown the construction of the device which may be used for operating the said surfaces.

The pipe 13 places the system 14, enclosed by the spherical dome 15, in communication with a compressed air tank, not shown.

In the cylinders 16, 16', 16'', 16''' are adapted to move pistons 17, 17' etc., which are subjected to the action of opposing springs 18. The diametral diaphragm 19, to which is secured, by a rigid rod 20, a balance weight 21, interrupts any communication between the chamber 14 and the interior of the cylinders 16 as long as the rod 20 remains at right angles to the plane AB.

At this moment the interiors of the cylinders 16 communicate with the atmosphere through suitable openings arranged below the periphery of the diaphragm 19.

When the apparatus rocks from one side to the other the plane AB will no longer be horizontal and the rod 20, under the action of the balance weight 20, tends always to remain in a vertical position so that the diametral diaphragm 19 tends to assume the position shown in chain dotted lines in Figure 3 in relation to the spherical dome 15 and the cylinders 16. At this moment the cylinder 16' is brought into communication with the chamber 14 and the piston 17' will be forced towards the end of the cylinder and produces the desired action on the surface to be operated.

When the apparatus returns to its normal position, the plane AB will again be horizontal so that the diaphragm 19 will have returned to its original position and the piston 17' will no longer be exposed to the action of the compressed air and will consequently produce the collapsing of the surface which was previously expanded, or vice versa.

In the apparatus shown in Figures 5 and 6, (apparatus which is characterized by a plurality of sustaining groups and by the combination with a pulling group 22 of a propeller group 23), the variable auxiliary surfaces which are used, instead of being composed of a series of blades capable of being expanded in the form of a fan may be composed of simple blades 24 movable about axes 25 and which, as required, may be caused to be extended from the hull or return into the interior of the latter.

These blades may be associated, grouped and disposed according to the requirements and according to the apparatus which is to be equipped therewith.

It will be understood that in carrying out the invention any other device of auxiliary surface may be used and other systems for the operation thereof. For example it is possible to use auxiliary surfaces which are capable of being folded against the hull and which when required may be spread out therefrom.

In order to produce the rotation of the apparatus about its vertical axis it is possible to use dorsal surfaces which are plain or curved and suitably directed.

The invention also includes all arrangements wherein there is used the action of a stream of air produced by the supporting plane or planes of the apparatus and acting on a variable auxiliary surface.

Having thus described my invention what I claim as new and desire to secure by Letters Patent is:—

1. In a helicopter a plurality of expanding surfaces, a spherical chamber with means for supplying compressed air to said chamber, a plurality of cylinders arranged around said chamber, pistons in said cylinders, operating means between said pistons and said expanding surfaces, and means for controlling the passage of air from the spherical chamber to the cylinders according to the tilting of the helicopters whereby said surfaces will be expanded in accordance with the tilting of the helicopter.

2. In a helicopter a plurality of expanding surfaces, a spherical chamber with means for supplying compressed air to said chamber, a plurality of cylinders arranged around said chamber, pistons in said cylinders, operating means between said pistons and said expanding surfaces, and means for controlling the passage of air from the spherical chamber to the cylinders according to the tilting of the helicopter whereby said surfaces will be expanded in accordance with the tilting of the helicopter, said means consisting of a diaphragm arranged diametrically in the spherical chamber, and means for normally retaining the diaphragm in the horizontal position so that it remains substantially stationary whilst the spherical chamber moves in relation thereto.

3. In a helicopter a plurality of expansible and collapsible members, and means for expanding and collapsing said members according to the tilting of the helicopter, said means comprising a spherical chamber and means for supplying compressed air thereto, said chamber having a plurality of openings arranged in the diametral plane thereof, a plurality of cylinders, the number of cylinders corresponding with the number of expansible and collapsible devices, said cylinders communicating with said openings, a plurality of pistons, one in each of said cylinders, connecting means between said cylinders and the corresponding expansible and collapsible devices, springs acting upon said pistons so as to normally hold said pistons in a position to the expansible and collapsible devices are in the collapsed position, a diaphragm diametrically arranged in said spherical chamber and adapted to co-operate with said diametral openings, and means for normally holding said diaphragm in a horizontal position.

4. In a helicopter a plurality of expansible and collapsible members, and means for expanding and collapsing said members according to the tilting of the helicopter, said means comprising a spherical chamber and means for supplying compressed air thereto, said chamber having a plurality of openings arranged in the diametral plane thereof, a plurality of cylinders, the number of cylinders corresponding with the number of expansible and collapsible devices, said cylinders communicating with said openings, a plurality of pistons, one in each of said cylinders, connecting means between said cylinders and the corresponding expansible and collapsible devices, springs acting upon said pistons so as to normally hold said pistons in a position to the expansible and collapsible devices are in the collapsed position, a diaphragm diametrically arranged in said spherical chamber and adapted to co-operate with said diametral openings, and means for normally holding said diaphragm in a horizontal position, said last mentioned means comprising a rod rigidly connected to the diaphragm at one end, and a balance weight secured to the other end of said rod.

ANTOINE PADOUE FILIPPI.